(12) United States Patent
Janzig et al.

(10) Patent No.: US 7,016,906 B1
(45) Date of Patent: Mar. 21, 2006

(54) DATA PROCESSING METHOD AND APPARATUS EMPLOYING OLE DB AND HAVING DUAL SCHEMA AND AUTO UPDATE FEATURES

(75) Inventors: Richard Charles Janzig, Mission Viejo, CA (US); David Michael Dahm, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/564,247

(22) Filed: May 4, 2000

(51) Int. Cl.
*G06F 17/00* (2006.01)

(52) U.S. Cl. .................. 707/101; 707/102; 707/103 R; 707/201; 707/205

(58) Field of Classification Search ............... 707/100, 707/101, 102, 103, 201, 202, 203, 204, 205
See application file for complete search history.

(56) References Cited

U.S. PATENT DOCUMENTS

| 5,600,778 | A | * | 2/1997 | Swanson et al. ............ 345/762 |
| 5,758,337 | A | * | 5/1998 | Hammond ..................... 707/6 |
| 5,926,816 | A | * | 7/1999 | Bauer et al. ................ 707/201 |
| 6,085,198 | A | * | 7/2000 | Skinner et al. ............. 707/101 |
| 6,119,130 | A | * | 9/2000 | Nguyen et al. ............. 707/100 |
| 6,212,534 | B1 | * | 4/2001 | Lo et al. .................... 707/511 |
| 6,216,136 | B1 | * | 4/2001 | Ronstrom ................... 707/203 |
| 6,401,239 | B1 | * | 6/2002 | Miron ........................ 707/203 |
| 6,453,310 | B1 | * | 9/2002 | Zander .......................... 707/1 |

* cited by examiner

*Primary Examiner*—Jean M. Corrielus
*Assistant Examiner*—Isaac M. Woo
(74) *Attorney, Agent, or Firm*—Mark T. Starr; Lise A. Rode; Beth L. McMahon

(57) ABSTRACT

Mapping of data source schema data types relating a server side database description into a set of OLE DB data types is rendered subject to user modification by provision of a dual Schema File at a client side terminal which contains an original unmodifiable copy and a modifiable working copy of the data source schema. When the server side database description is altered, user modifications to the modifiable copy are preserved as much as possible by performing a matching process on the client side in the course of generating new unmodifiable and modifiable schema files which comprise a new dual Schema File.

17 Claims, 19 Drawing Sheets

:KANJI - SCHEMA UTILITY    — □ ×

FILE   EDIT   VIEW   HELP

| ITEM NAME | ITEM DEFINITION | ITEM TYPE | OLE DB TYPE |
|---|---|---|---|
| NAME | KANJI(5) | ITEM_DB_ALPHA | DBTYPE_WSTR |

35

[-] . ZOO
[+] ..ANIMAL_SET
[-] ANIMALS
   …[NAME] 33
   …NUM_COL
   …ORD
   …NOISE
   …MOVEMENT
[+] DUP_SET

FOR HELP, PRESS F1    NUM

*FIG. 14*

DATA PROCESSING METHOD AND APPARATUS EMPLOYING OLE DB AND HAVING DUAL SCHEMA AND AUTO UPDATE FEATURES

BACKGROUND OF THE INVENTION

1. Field of the Invention

The subject invention relates generally to data processing systems and more particularly to a method and apparatus for coordinating changes made in a server side database representation with user modifications made to a dual schema file maintained on a client-side workstation.

2. Description of Related Art

In the present state of the art, data is located everywhere: on mainframe servers, on PC desktops, on the web. Data resides in these environments in many different formats: relational and non-relational database management systems, ISAM files, e-mail, spreadsheets, audio, video, real time data feeds for news and stock, CAD/CAM systems, and so on.

With today's tools and software technology, there is increasing pressure to provide access to this diverse data from multiple clients using standard interfaces, without moving the data from its origin. Businesses need to build solutions that span desktops, servers, and the Internet. In addition, the end user wants to access this data in the same way, regardless of the language used.

In order to facilitate access to structured and unstructured data in such diverse locations, Microsoft Corporation has developed a software interface specification known as OLE DB. OLE DB particularly provides a set of Component Object Model (COM) interfaces. According to OLE DB, data "Providers" are employed to expose data stored as OLE DB compliant data sources so as to allow access to them by OLE DB data "consumers".

In one environment where the preferred embodiment finds application, a Data Provider provides communication between OLE DB data consumers on Windows workstations or servers and prior art data sources consisting, for example, of a Unisys DMS II database. A Data Provider per se is a component in Microsoft's Universal Data Access model.

In such an environment, Client data is stored in PC format, which means that alpha data is encoded in ASCII characters and integers are stored with their bytes in reverse order (a characteristic of the Intel processors that are typically used on PC's). The format of data as stored in prior art data sources is typically quite different. For example, alpha data on the host data source may be encoded in EBCDIC and integers may be stored with their bytes in normal order. Such encoding and storage is employed for example in Clearpath and A-Series environments present on prior art computer systems manufactured by Unysis Corp., Blue Bell, Pa.

The Data Provider of the preferred embodiment defines a format (the common data source schema) for describing the structures and data items for all the supported data sources. Within the common data source schema, each of the prior art data sources has some unique data types. The OLE DB specification also defines a set of data types. The mapping of prior art data source data types to the OLE DB data types is not always obvious or clear-cut. For example, the DMSII data source does not have a "date" data type, although dates are stored in DMSII databases. OLE DB does have a "date" data type. Moreover, the elements of the common data source schema may appear in formats which are not as recognizable or meaningful to the user as they might be.

In the inventors' co-pending application entitled "OLE DB DATA ACCESS SYSTEM WITH SCHEMA MODIFICATION FEATURES" incorporated by reference herein, a method and apparatus are disclosed whereby the mapping between data types may be reassigned and structure and data item names and other parameters altered by a user. A dual Schema File is maintained at a client side terminal, the Schema File containing an original copy of the data source schema and a modifiable copy of the data source schema. The contents of the modifiable Schema File may then be displayed in a split window format including one window which provides a tree view of the schema structure and an adjacent window which displays a set of values related to the selected element of the tree view and one or more of the values may then be modified by executing a point and click operation on selected areas in the second window. "Point and click" encompasses equivalent screen selection operations, such as for example, point and touch operations using a stylus, as presently implemented on various palm-held devices.

The approach of our co-pending application readily handles user-side schema modification. However, it does not address handling of changes to the database description of the prior art database made by, for example, a database administrator on the database or data source side of the system.

SUMMARY OF THE INVENTION

According to the invention, when the database description is altered, for example by a database administrator, the client side is informed of the user description, and a new dual Schema File is created. In the course of creating the new file, matching operations are performed between the new schema and the previously existing schema to retain as many of the modifications made by the user to the original schema as possible. A new dual Schema File is created by this process and stored.

Various objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

The embodiment of the just summarized invention will now be described in detail in conjunction with the drawings of which:

FIG. 14 illustrates the nature of a thirteenth display screen provided according to the preferred embodiment;

DETAILED DESCRIPTION OF AN EMBODIMENT

Figure 1:
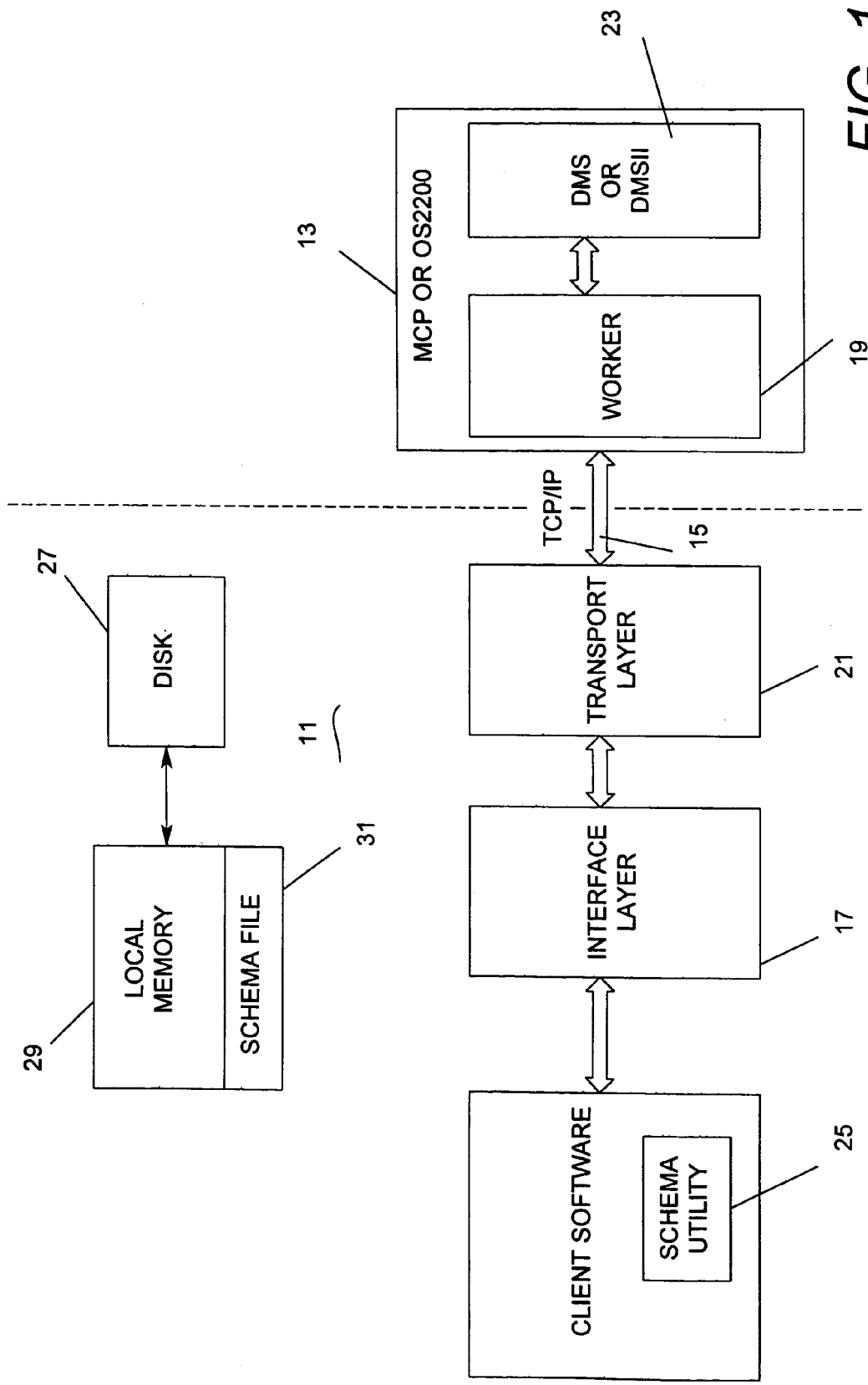
FIG. 1 is a system block diagram illustrating a system wherein the preferred embodiment of the invention finds application.

FIG. 1 illustrates an environment where a preferred embodiment of the invention finds application. This environment includes a client 11 and a server 13, which communicate with one another across a TCP/IP connection 15. The client 11 and server 13 each comprise computer controlled apparatus, as known in the art.

In operation, the client 11 sends messages called "requests" across the connection 15 to the server 13, and the server 13 returns messages called "results" across the connection 15 to the client 11. Requests and results consist of strings of bytes. A request might, for example, ask for return of all data having a certain characteristic and stored on a database forming part of the server 13.

On the client 11, data is stored in PC format, which, as noted above, means that alpha data is encoded in ASCII characters and integers are stored with their bytes in reverse order. The format of data on the host (server) 13 is typically quite different. For example, alpha data on the host 13 may be encoded in EBCDIC with integers stored with their bytes in normal order.

In one environment where the preferred embodiment finds application, a "Data Provider" provides communication between OLE DB data consumers on Windows workstations (e.g., "client" 11) and prior art data sources consisting, for example, of a Unisys DMS II (or DMS) database 23, either one of which is associated with a main frame computer.

A particular Data Provider design created by Unisys includes three major components, which are illustrated in FIG. 1. The major components include a front end called the OLE DB Interface Layer 17 (or simply Interface Layer). The Data Provider further includes a back end called the Worker 19 that accesses the database management system (e.g., DMS II 23), as well as an intermediate component called the Transport Layer 21 that provides connectivity between the Interface Layer 17 and the Worker 13. The Interface Layer 17 and the Transport Layer 21 are implemented as component object model (COM) components.

The function of the Transport Layer 21 is to send and receive messages between the Interface Layer 17 and the Worker 19 and to provide the necessary marshalling and unmarshalling services. The Transport Layer 21 establishes and maintains connections with the host using TCP/IP as the connection protocol.

The Interface Layer exposes a Windows based COM API (application program interface), which consists of a subset of the standard OLE DB interfaces. This subset includes all of the mandatory OLE DB interfaces, as well as those optional OLE DB interfaces necessary to allow full exploitation of the capabilities of the data sources.

When the OLE DB Interface Layer 17 receives an open rowset command (basically a query) from the data consumer, it passes the query to the Transport Layer 21. The Transport Layer 21 builds a tree structured collection of nodes called a "plan" to represent the query and saves it until the first call for access to the rowset is received. When the first rowset access command is received, a query using the saved plan is formulated and encoded (marshalled) for delivery to the Worker 19.

The Worker 19 interprets the plan and generates the appropriate DMSII calls to execute the query. The data that is returned by the DMSII 23 is then returned. The OLE DB Interface Layer 17 fetches the requested rows from the Transport Layer 21, converts each column in all of the rows to the format requested by the Consumer, and copies the data into the Consumer's memory space.

In the preferred embodiment, different designations of stored data exist at different points in the system. For purposes of the subject application, these designations are defined as follows:

Database description: a description of a prior art database such as a DMS or DMSII database 23, which resides on a mainframe. This description is the master definition of the database and is created on the mainframe by prior art database tools. The database description can change if the prior art database structure is modified or reorganized.

Schema: a description of a prior art database, which resides on a workstation 11. This description is derived from the database description and converted by the Interface Layer 17 to a form that is oriented to the use of OLE DB on the workstation 11.

Dual Schema File: a binary file, generated according to the preferred embodiment, which resides on a workstation and contains two copies of a schema—an unmodifiable original and a modifiable working copy. This file is created by the Interface Layer, but can be modified by a Schema Utility as hereafter described. The Schema Utility only modifies the working copy schema.

Within the common data source schema, each of the prior art data sources, e.g., DMS or DMS II, has some unique data types. OLE DB also defines a set of data types. The mapping of data source data types to the OLE DB data types is not always obvious or clear-cut. For example, the DMSII data source 23 does not have a "date" data type, although dates are stored in DMSII databases. OLE DB does have a "date" data type.

In the environment under discussion, prior art data source data types such as those employed DMSII are required to be described in OLE DB terms. Accordingly, a "default mapping" is employed which assigns a particular OLE DB type to describe a particular DMS II data types.

With respect to FIG. 1, the Schema Utility 25 reads a Schema File 31 created by the Interface Layer in disk storage 27. The Schema File 31 contains a description of the prior art data source (e.g., DMSII 23) in the format defined by the Data Provider. When the client is done making modifications to the Schema File 31 and requests that the changes be saved, the Schema Utility 25 updates the Schema File 31 on the workstation disk 27. The changes are then visible the next time the Data Provider connects to the data source 23. None of the changes affects the data in the data source 23. The modified Schema File 31 can be copied to other workstations to be used by other clients, if desired.

If a value of an item has been modified in the current or a previous session, the client can ask to have the modification undone, and it will be changed back to its original value. As will be illustrated below, this is done by selecting a column heading or a current value, selecting a restore button in an edit dialog box, and then selecting "update".

The OLE DB Schema Utility 25 of the preferred embodiment is Windows-based. In particular, it is a Microsoft Foundation Class, Single Document Interface, Win32, Graphical User Interface, Visual C++ program. It uses a simplified Document-View architecture to present a data source schema in a split window graphical user interface format for updating by a client. The majority of the updating done by the client is by point and click, only the text for names and numbers for values need to be typed in. The structural operation of the program itself is discussed in more detail in the aforementioned co-pending application.

Figure 2:
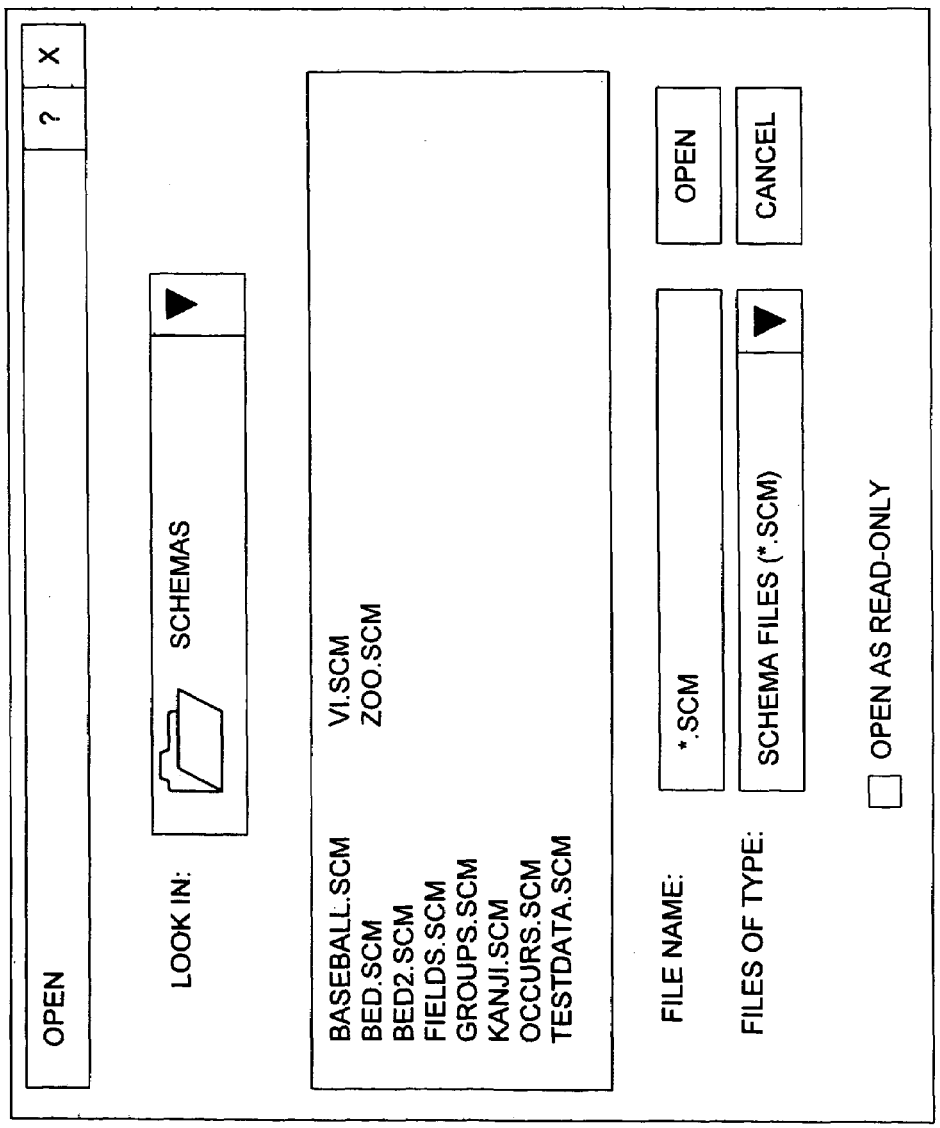
FIG. 2 illustrates the nature of a first display screen provided according to the preferred embodiment.

Referring now to FIG. 2, the Schema Utility 25 uses the Windows common file control to open and save Schema Files. The "open" command searches for files with a .scm extension. As noted above, the Schema File 31 created by the Interface Layer contains two copies of the schema: the original, and a modifiable copy. The Schema File 31 is a binary file with the names written in wide characters. No changes are committed to the Schema File 31 until the client has selected a "save" option. Any change to an attribute of the schema can be undone, returning the changed attribute back to the value stored in the original copy of the schema.

Figure 3:
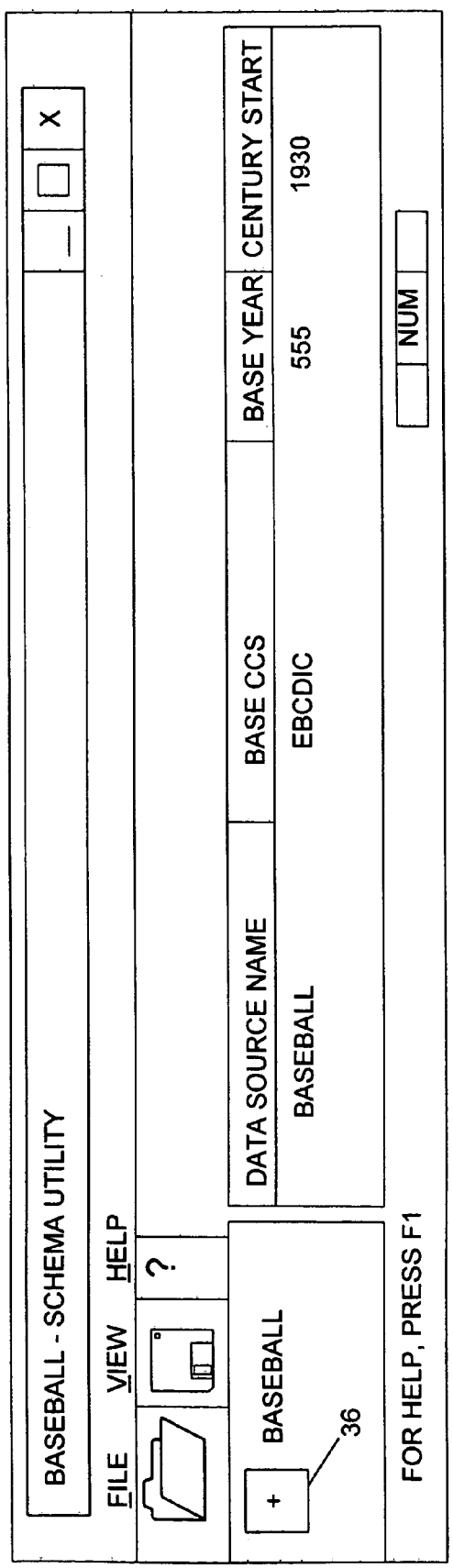
FIG. 3 illustrates the nature of a second display screen provided according to the preferred embodiment.
Figure 4:
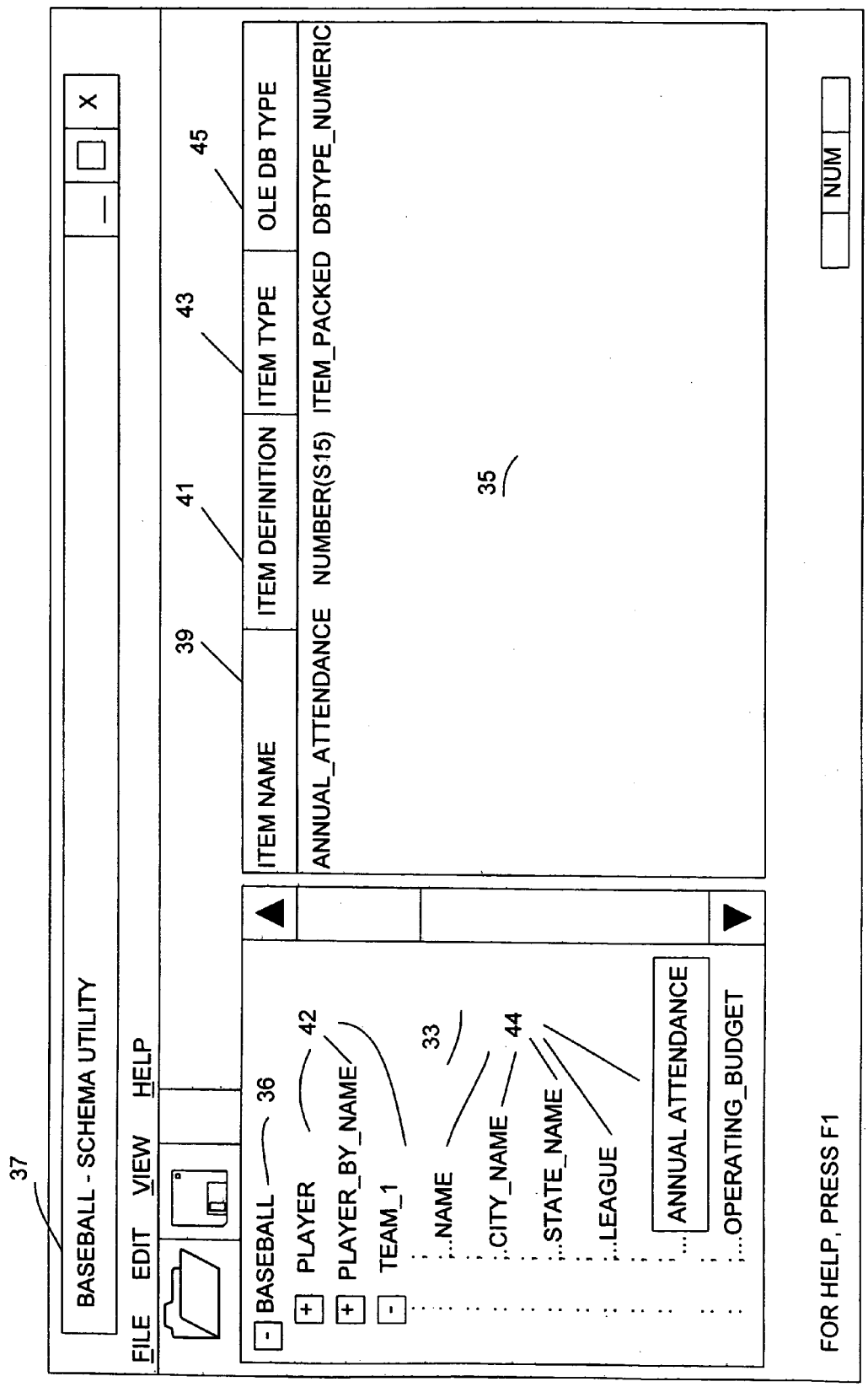
FIG. 4 illustrates the nature of a third display screen provided according to the preferred embodiment.

When the Schema File 31 is opened, a tree view 33 is created, but is shown unfolded, as illustrated in FIG. 3. The client can expand the tree view 33 by selecting the "plus" signs (+), e.g. 36, beside the different items. A result of such selection is shown in FIG. 4. The highest level in the tree, the root node, ("baseball" in FIG. 4) is the data source. The next level displays the data structures, e.g., 42, in sorted order. The third level and beyond display the data items, e.g., 44.

To see the details of an individual item, the client selects the name in the tree view 33, for example, "annual attendance" as shown in FIG. 4. The tree view 33 contains some visual clues about special types of items. Subordination indicates that the parent node has a defining or controlling relationship to the leaf nodes underneath. Other visual clues are used to indicate variable format data items and occurring data items. In particular, the data items in variable format records are indicated by their type number followed by a colon. Occurring data items are indicated by square brackets following their name. The number in the brackets is the number of times the data item can be repeated. Group data items are shown as subordinate to the group name. Field data items are also shown as subordinate to the field name.

As may be appreciated from FIGS. 2–4, the user interface has a look and feel similar to Windows Explorer. The main window is divided into two panels 33, 35. The left panel 33 contains the tree view control showing the schema. The root node 37 ("baseball"), visually the top item of the tree view, is the data source. The right panel 35 of the main window contains a list view control that gives the details of an item which has been highlighted in the left panel 33. The right panel 35 presents the details of the item in a column view display. The number of columns, e.g., 39, 41, 43, 45 of FIG. 4 and their titles change depending upon the highlighted item. The first column 39, however, always contains the item's name.

If a value of an item in the column view display is modifiable, selecting the column heading or the value causes a dialog box to pop up. Help text may be made available to describe the options presented by the dialog. In the present embodiment, the modifiable values of the data source schema are:

Base CCS (code character set)
Double-Byte CCS (if an item_db_alpha, USAGE IS KANJI, item exists)
Base Year
Century Start
Structure Name
Data Item Name
Data Item Type The Schema Utility 25 allows the client, via point and click, to modify the Item Type 43 whenever there is a possible alternate mapping of the item to an OLE DB Type. For example, the utility 25 enables converting an Item Type 43 of "item_alpha" to "item_BYTES". The Utility 25 also allows the client to modify the Item Name 39. The nature of the left and right panel displays 33, 35 and various point and click operations are illustrated further in the following FIGS. 5–15.

Figure 5:
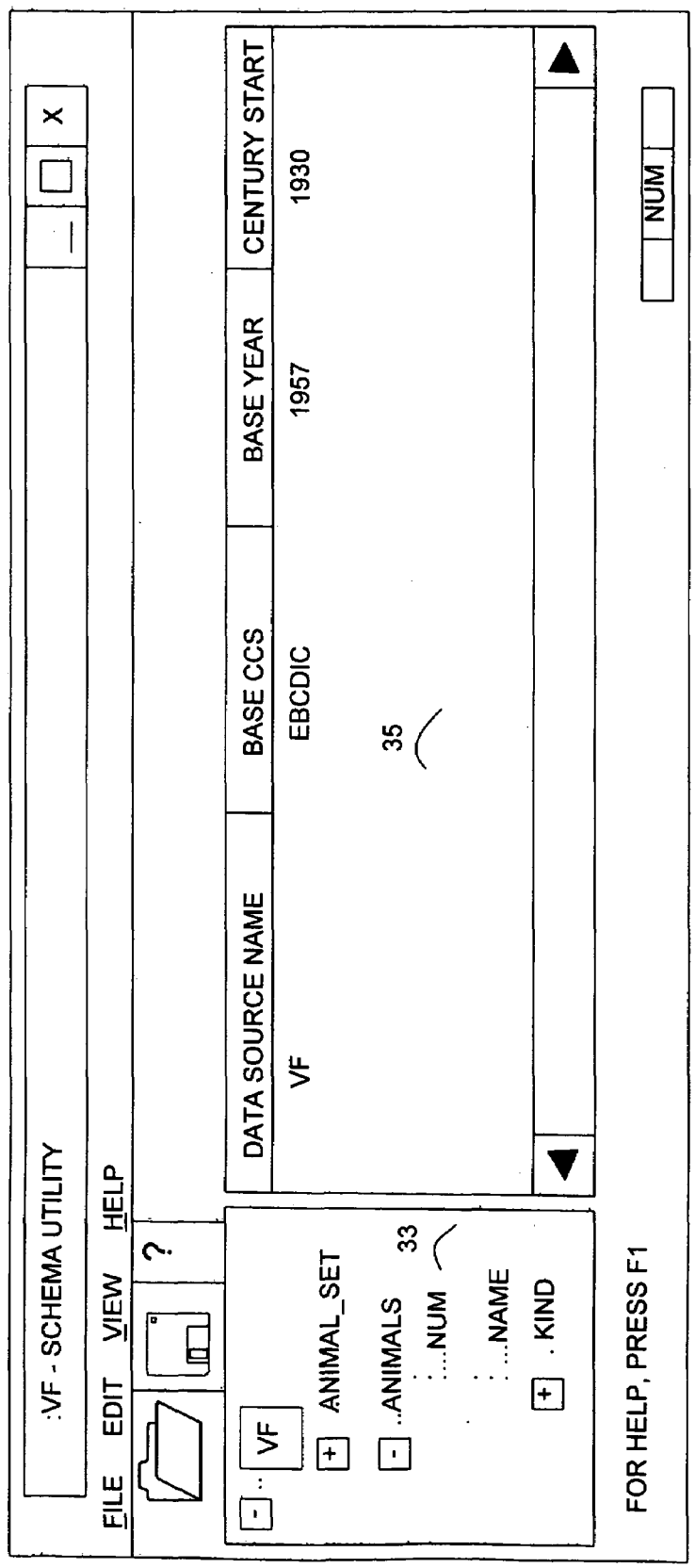
FIG. 5 illustrates the nature of a fourth display screen provided according to the preferred embodiment.

In the display of FIG. 5, the column view of the top level (the root node) of the data source contains the highlighted data source name ("vf"), the coded character set (CCS) of the alpha data items ("EBCDIC"), and the base year and the century start values ("1957", "1930") for date handling. If the data source has double-byte alpha data items, the double-byte coded character set value is also displayed.

Figure 6:
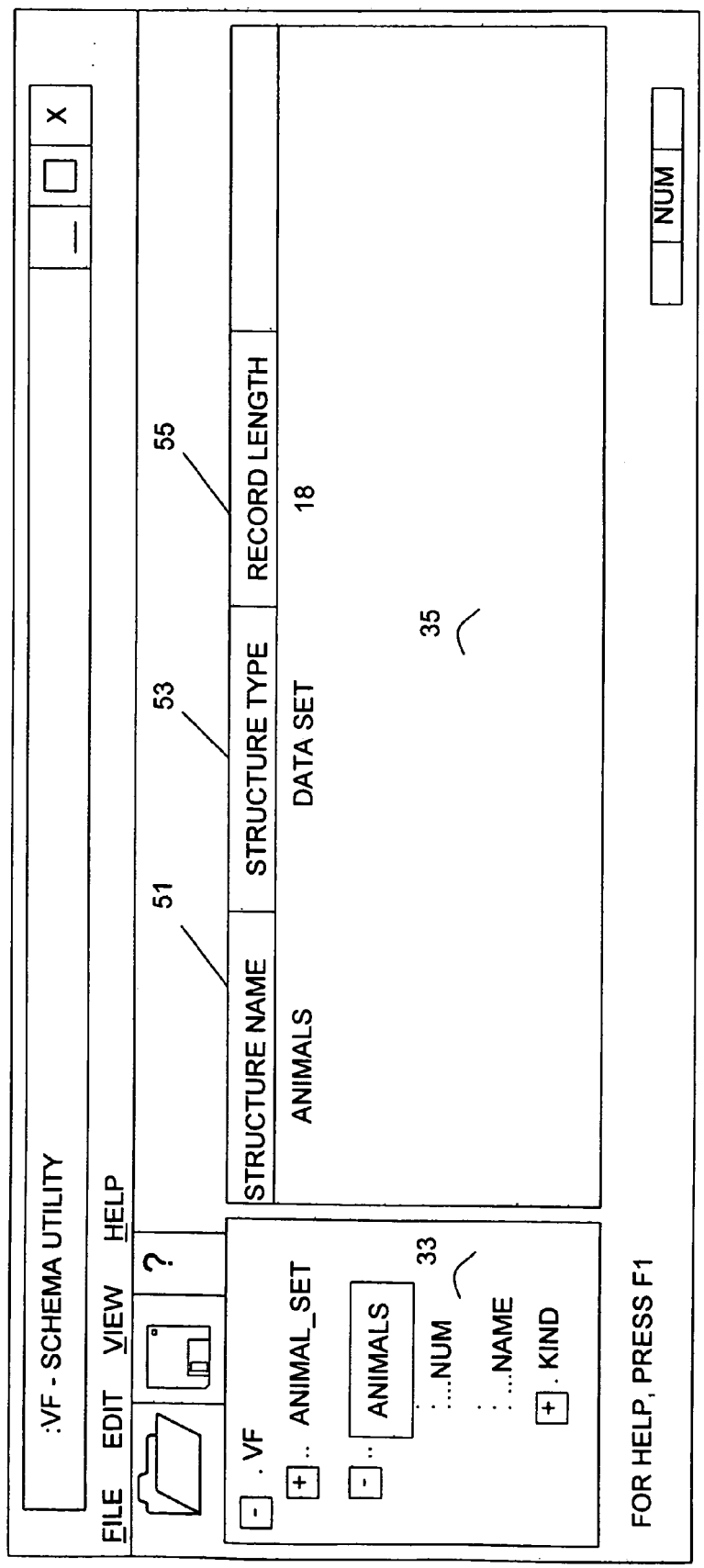
FIG. 6 illustrates the nature of a fifth display screen provided according to the preferred embodiment.

As shown in FIG. 6, highlighting the next level "animals" in the tree provides display of the structures defined for the "vf" data source. The column view displays the structure name (col. 51) and the structure type (col. 53). If the structure is a data set, then the column view also displays the length of the data structure (col. 55), as further illustrated in FIG. 6.

Figure 7:
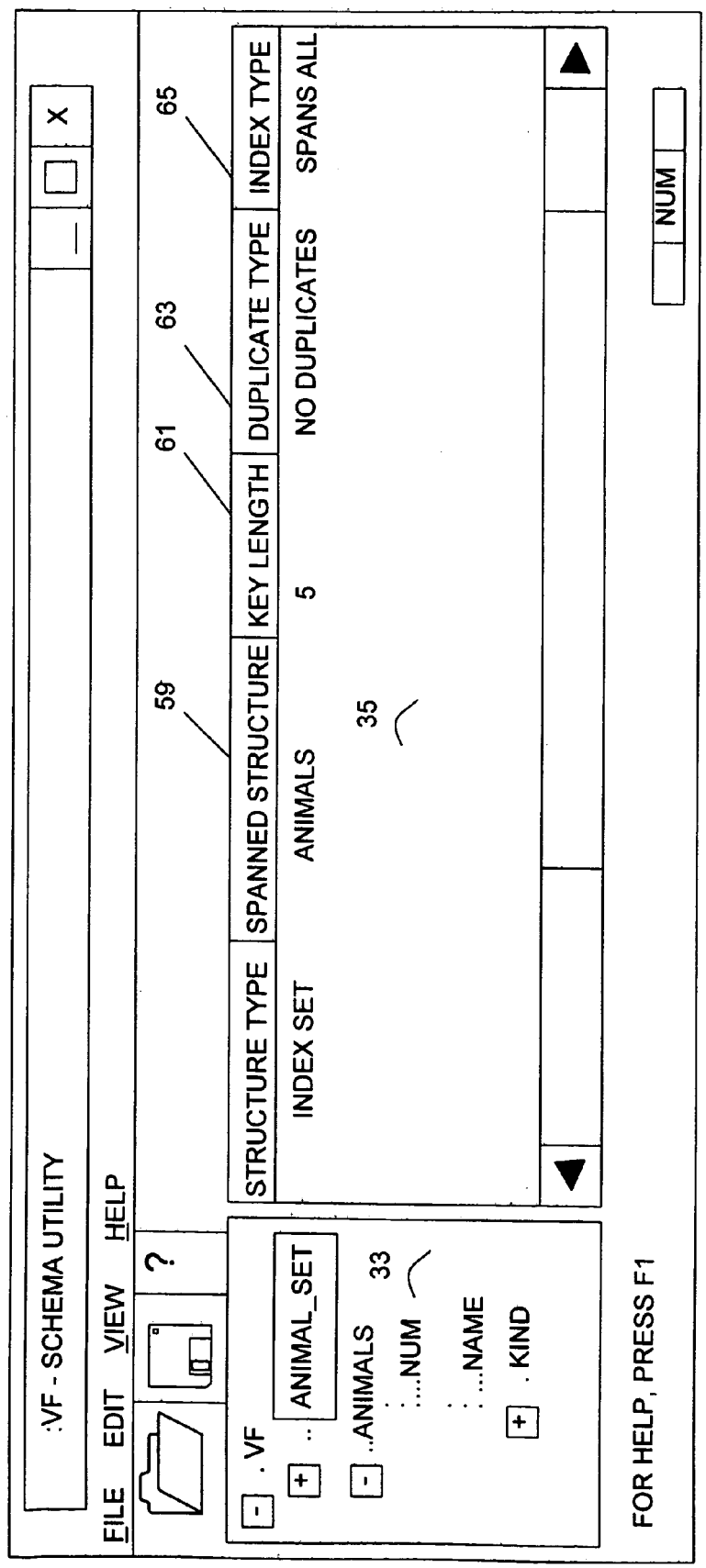
FIG. 7 illustrates the nature of a sixth display screen provided according to the preferred embodiment.

As shown in FIG. 7, if the structure is an index set, then the column view displays the name of the structure that the index set spans (col. 59), the length of the index key (col. 61), whether or not duplicates are allowed (col. 63), and the type of index (col. 65).

Figure 8:
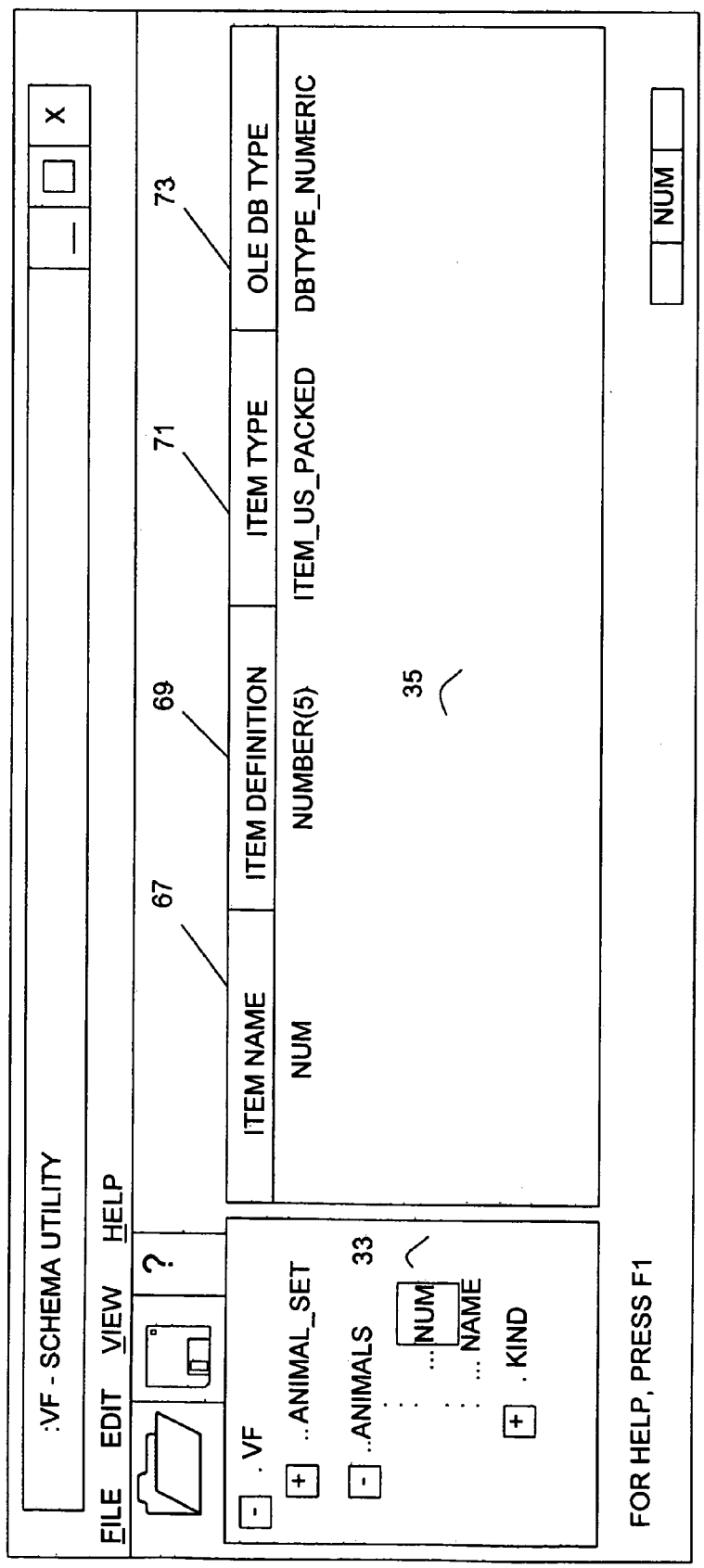
FIG. 8 illustrates the nature of a seventh display screen provided according to the preferred embodiment.

The next level in the tree, illustrated in FIG. 8, displays the data items within a structure. The column view displays the name of the highlighted data item (col. 67), the definition of the data item in a Data Structural and Definition Language (DASDL)-like format (col. 69), the prior art data source (e.g., Clearpath, A Series, etc.) data type of the data item (col. 71), and the OLE DB data type (col. 73) that the data item will be mapped into by the Data Provider.

Figure 9:
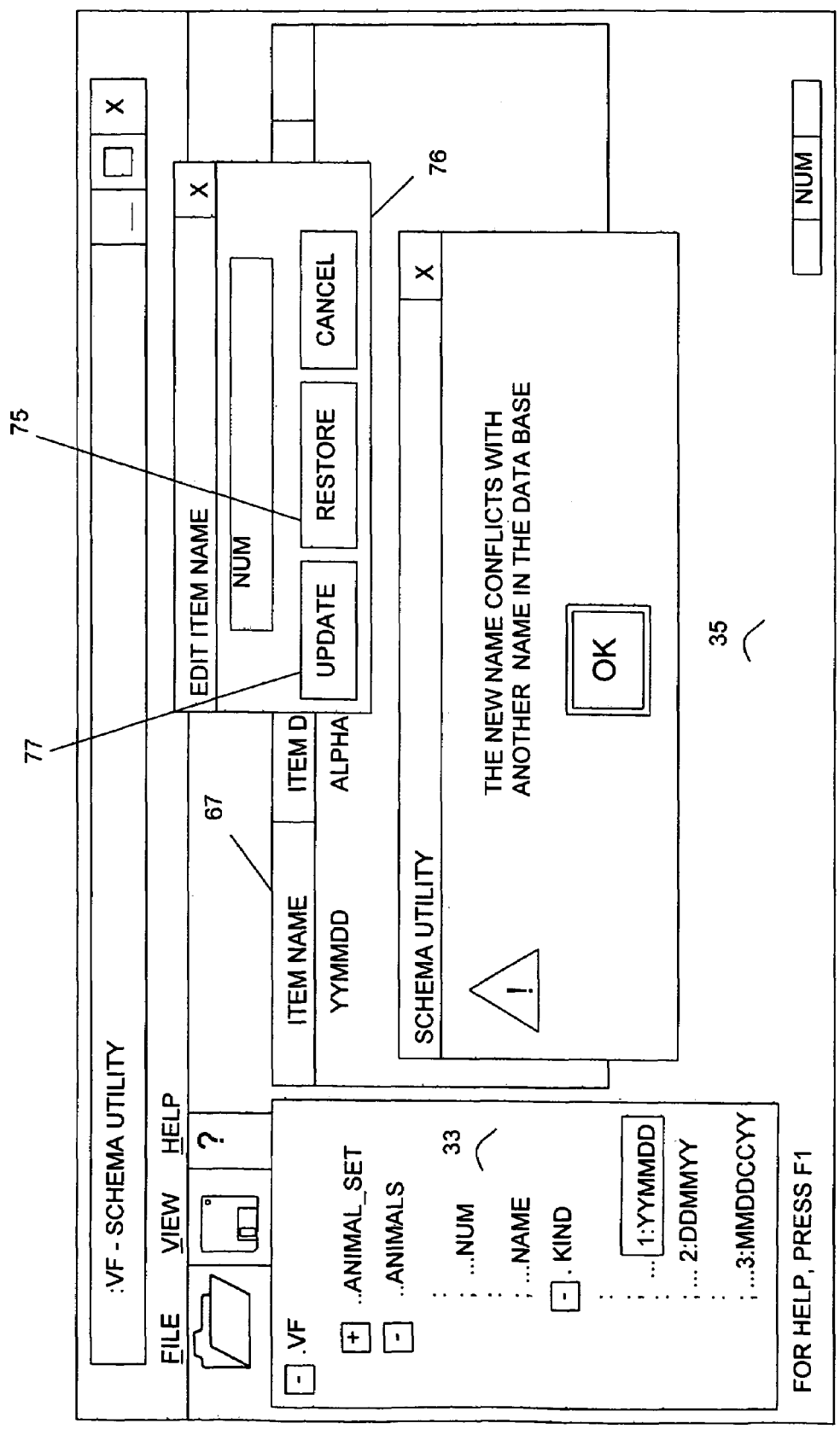
FIG. 9 illustrates the nature of a eighth display screen provided according to the preferred embodiment.

If the client selects the name of a data item in the tree view 33, then the Item Name or Item Type values can be modified. In the case of FIG. 9, the Item Name value "yymmdd" has been selected. FIG. 9 illustrates the situation where the client types in a new name "NUM" in a dialog box 76, but the new name conflicts with the name of another data item in the structure "animals". The conflicting new name cannot be selected. (Note that name comparisons are case insensitive.) After recognizing the conflict, the client then types a new name in the dialog box 76 that is acceptable.

The client restores a data item to its original value by first selecting the column heading or the current value in the column view. Then the client selects the restore button 75 (FIG. 9), and the Schema Utility 25 selects the original value from the list. When the client then selects the update button 77, the original "Item Name" value will be restored in col. 67.

Figure 10:
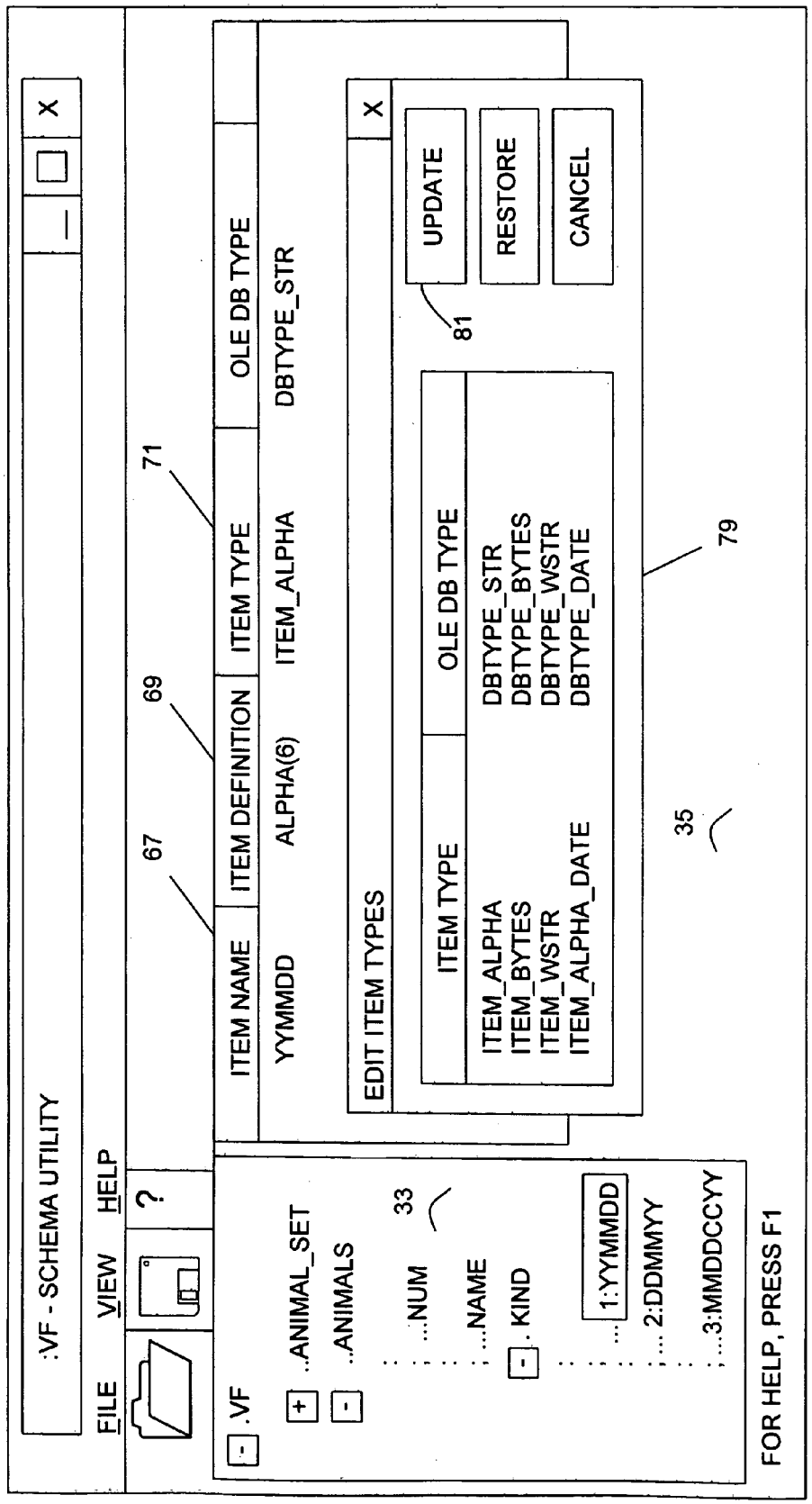
FIG. 10 illustrates the nature of a ninth display screen provided according to the preferred embodiment.

In the case illustrated in FIG. 10, an "Edit Item Types" dialog box 79 has been initiated. A box 79 may be initiated by selecting the Item Definition, Item Type, or OLE DB Type column headings 67, 69, 71 or one of the values underneath the headings. With respect to the FIG. 10, the client selects a new Item Type by selecting the new Item Name in the dialog box 79 and then selecting the update button 81.

Figure 11:
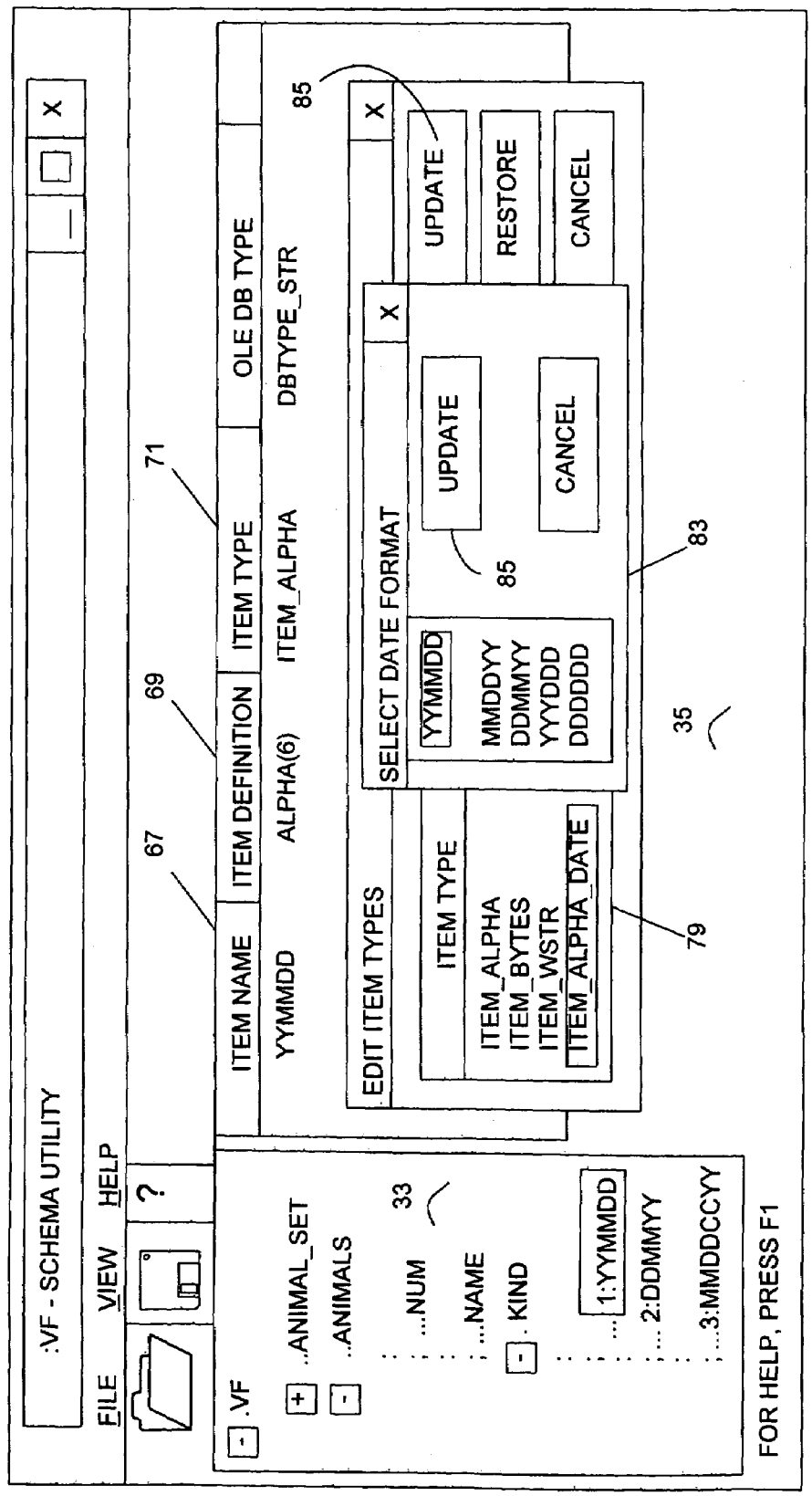
FIG. 11 illustrates the nature of a tenth display screen provided according to the preferred embodiment.
Figure 12:
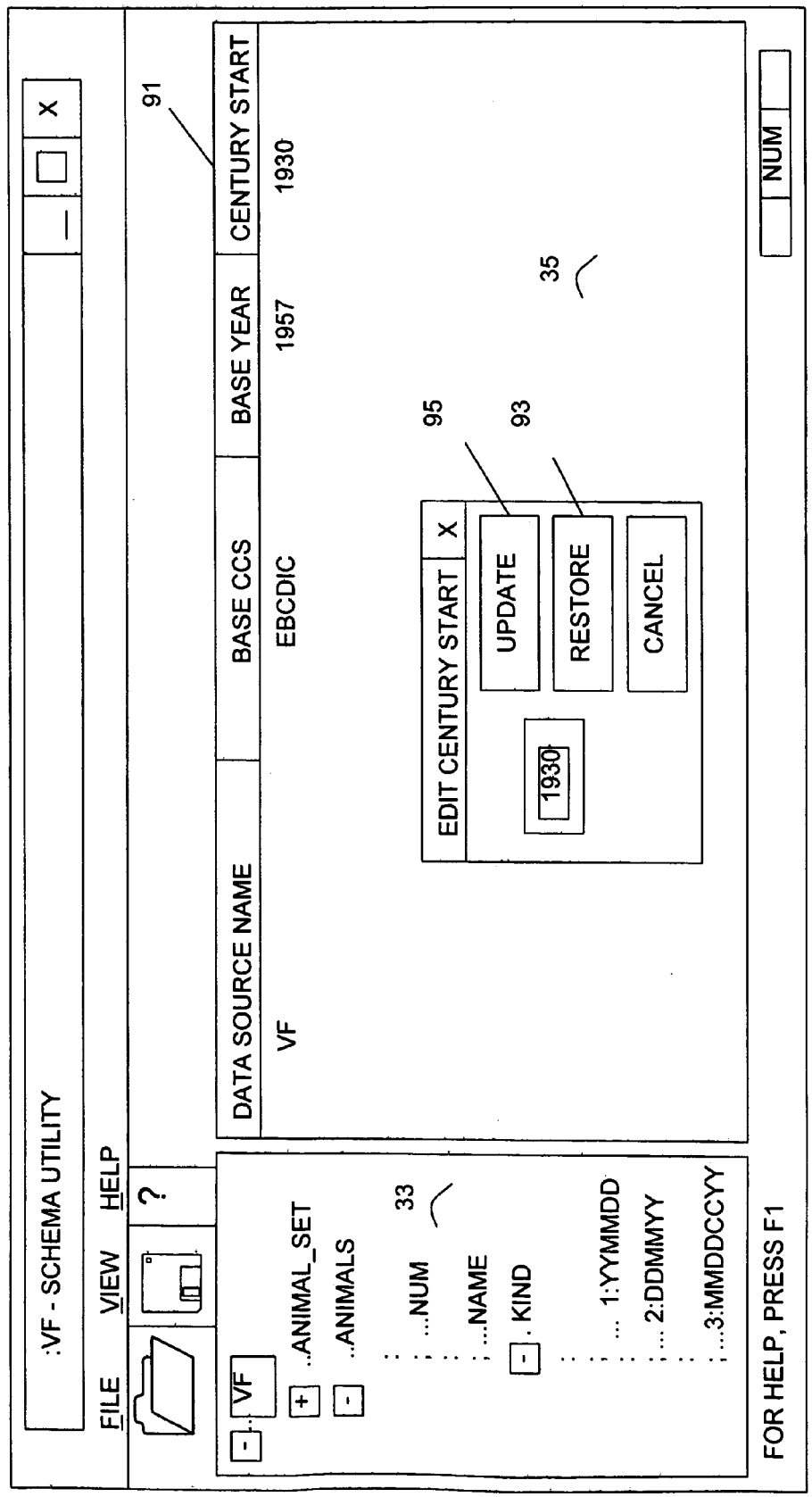
FIG. 12 illustrates the nature of a eleventh display screen provided according to the preferred embodiment.

In the case shown in FIG. 11, because item_alpha_date was selected, one additional selection must be made before the task is complete. In particular, the format of the date must be selected utilizing the automatically appearing dialog box 83.

When the date format is selected and the update button 85 pushed, the item is changed in the in-memory schema 31 and the column view 35 is updated so that the "Item Definition", the "Item Type" and the "OLE DB Type" are changed in the display, respectively, to "A-DATE(YYMMDD)", "item_alpha date", and "DBTYPE_DATE".

The client restores a data item to its original value by first selecting the column heading or the current value in the column view. Thus, after button 85 has been pushed in FIG. 11, the Item Type value "item_alpha_date" could be selected, which causes a dialog box similar to box 79 to appear which presents the previous value, a restore button, and an "update button". To restore this value to the prior value "item_alpha", the client selects the restore button and the Schema Utility 23 selects the original value "item_value" from the list. When the client then selects the update button, the original Item Type value "item_value" will be restored.

If the client selects the name of the data source (the root node) in the tree view 33, then the Base Year or Century Start values can be modified. In the case illustrated in FIG. 12, the Century Start (col. 91) value "1930" has been selected. If the client changes the date to "1980", but then regrets it, the client may restore the date to "1930" by again selecting the Century Start column heading or the date value in the column view and then selecting the restore button 93. When the client then selects the update button 95, the original Century Start value will be restored.

Figure 13:
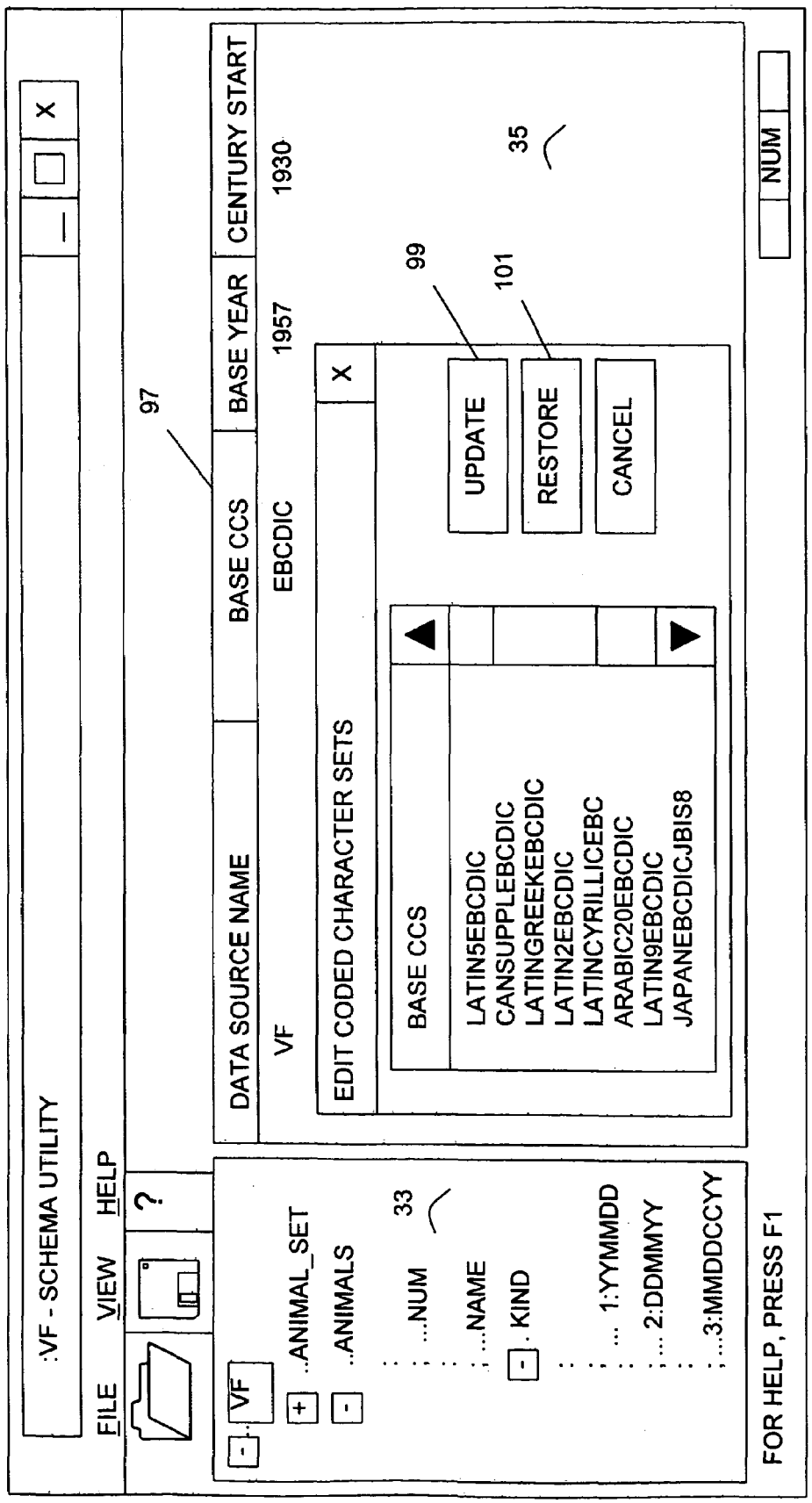
FIG. 13 illustrates the nature of a twelfth display screen provided according to the preferred embodiment.

If the client selects the name of the data source (the root node in) the tree view 33, then the Base Coded Character Set (and possibly the Double-Byte Coded Character Set) values can also be modified. In the case of FIG. 13, the Base CCS value "EBCDIC" has been selected by selecting the Base CCS column heading 97 or its value in the column view. The client may then select JAPANEBCDICJBIS8 and then the update button 99 to change the character set. To restore, the client again selects the Base CCS column heading 97 or its value in the column view, and then selects the restore button 101. When (or if) the client thereafter selects the update button 99, the original Base CCS value will be restored.

Figure 15:
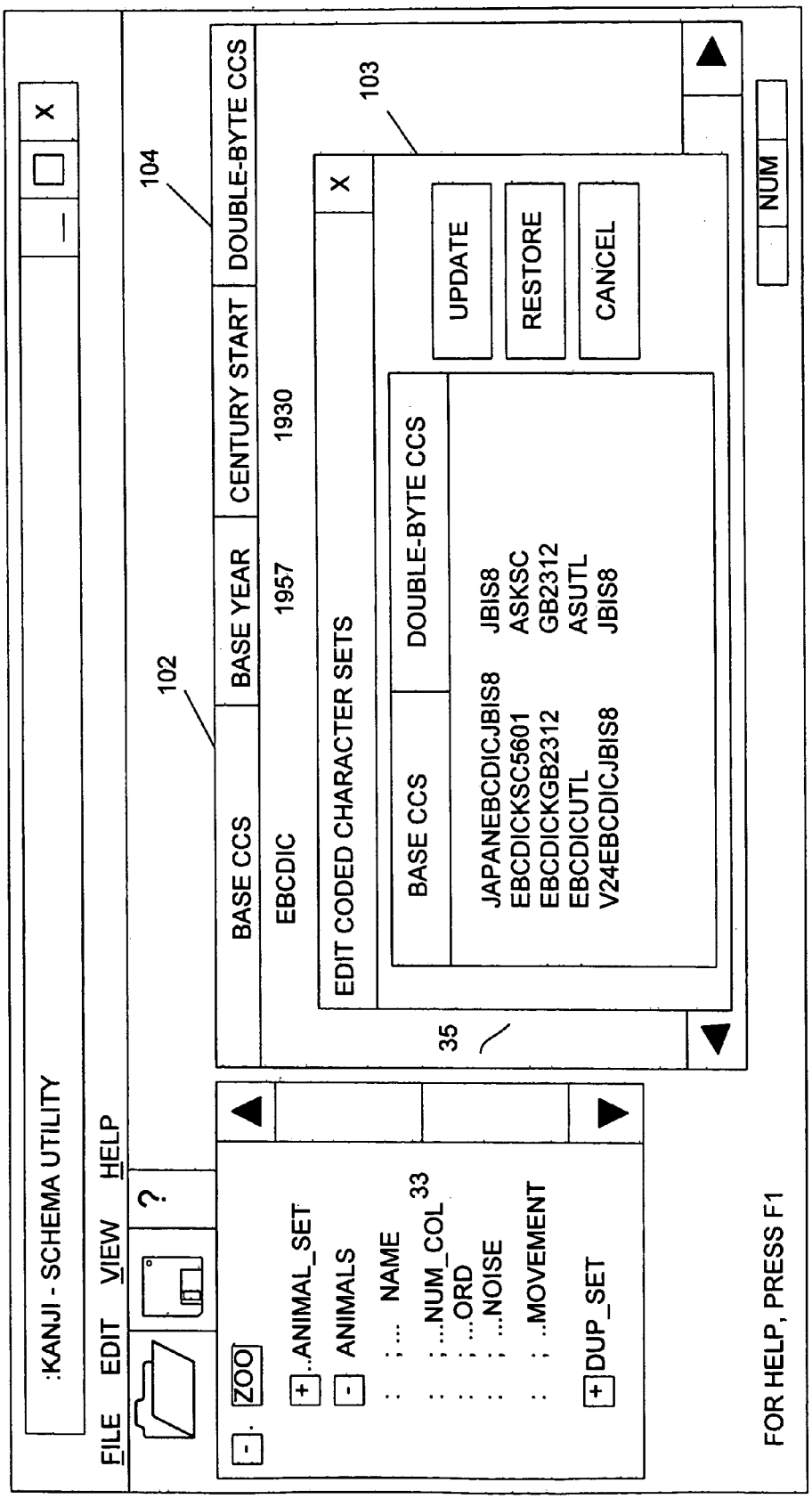
FIG. 15 illustrates the nature of a fourteenth display screen provided according to the preferred embodiment.

The schema illustrated in FIG. 14 has a double-byte alpha data item. At the root nodes, both Base CCS and Double-Byte CCS columns 102, 104 are displayed, as shown in FIG. 15. In the case of FIG. 15, the initial values do not correctly identify the coded character sets that are needed to support the alpha data in the data source. To correct this situation, either the Base CCS heading or its value EBCDIC or the Double-Byte CCS heading or the blank space under it is selected, resulting in display an Edit Coded Character Set dialog box 103, as shown in FIG. 15. The CCS values must be updated as a pair. Since the original values are not a member of the set of possible choices, no value has been selected as the default value by the Schema Utility 25. The update button is not available until a selection has been made. The client then selects JAPANEBCDICJBIS8 in the dialog box 103 and then selects the update button 105. As a result, both the Base CCS and the Double-Byte CCS column values are updated to "JAPANEBCDICJBIS8" and "JBIS8", respectively. If the client regrets his or her choice and selects either CCS column heading or value in the column view, the Edit CCSes dialog will reappear. In this case, the restore button is not available because the original values were not valid for a schema with double-byte alpha data. If the client tries to close the Schema File without fixing the problem with the CCSes, the Schema Utility displays an error message.

Figure 16:
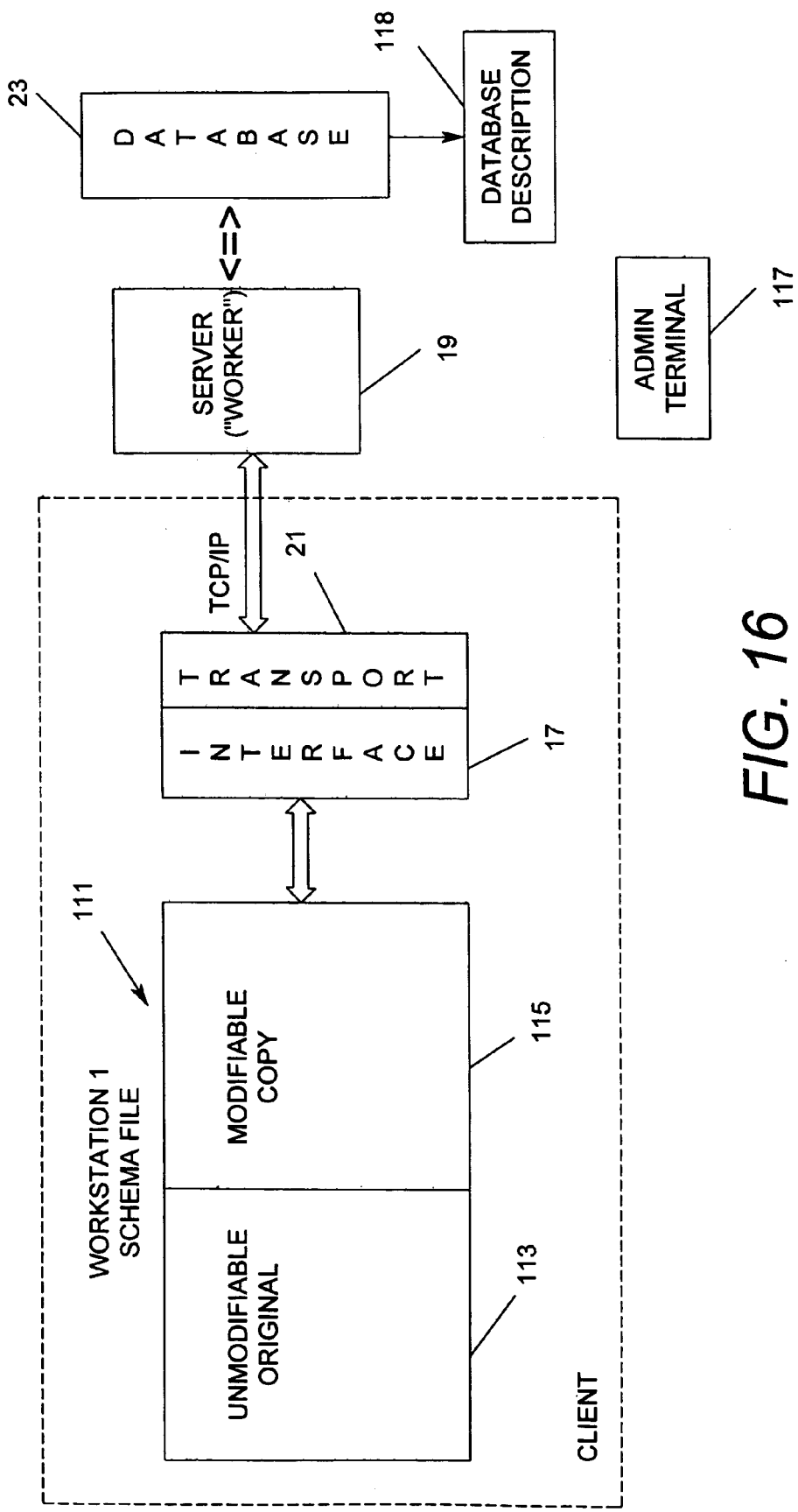
FIG. 16 is a system block diagram illustrating further aspects of a system wherein the preferred embodiment finds application.
Figure 17:
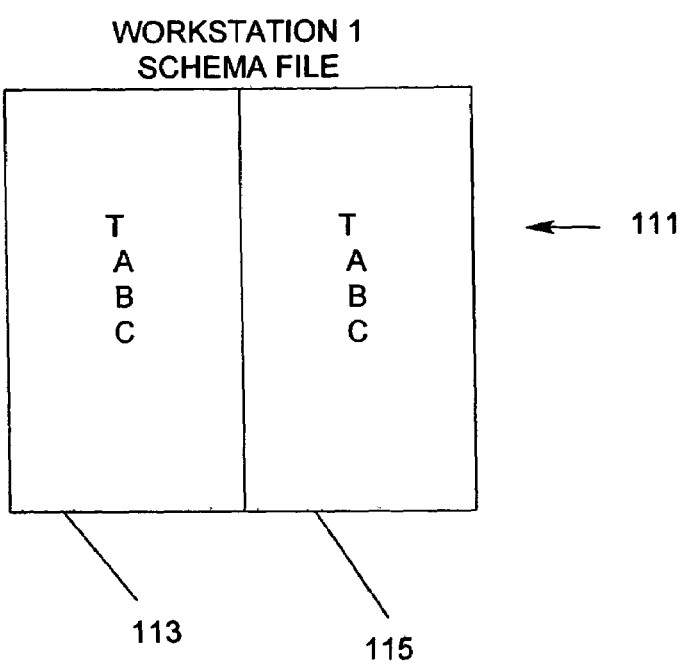
FIG. 17 illustrates a work station schema file according to the preferred embodiment.
Figure 18:
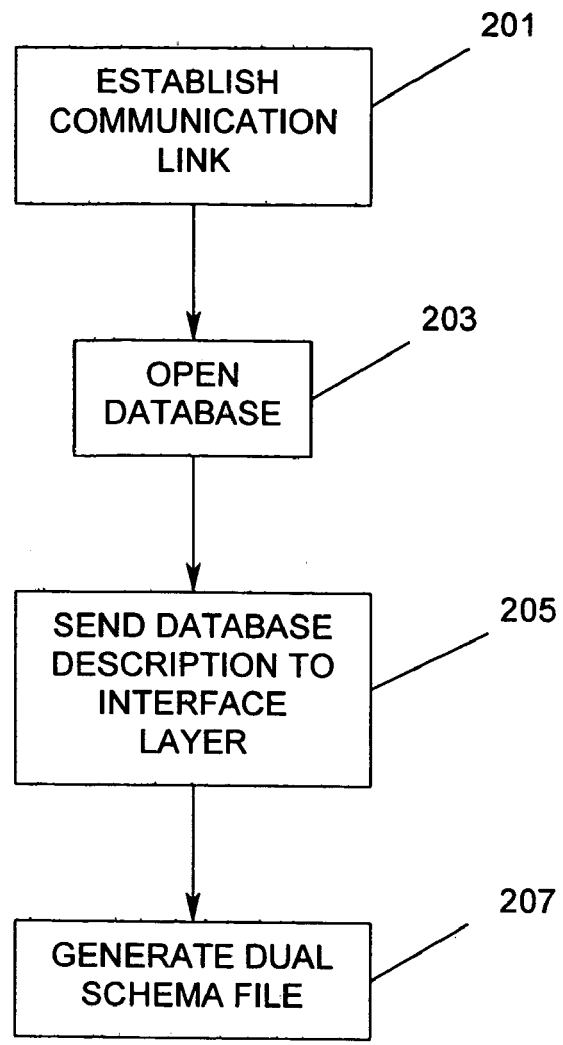
FIG. 18 is a flow chart of a first process implemented in connection with the apparatus of FIG. 16.

The manner in which schema updates are handled will now be discussed further in connection with FIGS. 16–18. Initially, at the request of an OLE DB client on the workstation, the Interface Layer 17 establishes communication with the worker 19, step 201 of FIG. 18. The worker 19 opens the database 23, step 203, and sends a copy of the database description 118 to the Interface Layer 17, step 205. The Interface Layer 17 converts the server side database description 118 into a dual Schema File 111, as shown in FIG. 16, which contains an unmodifiable copy 113 and a modifiable copy 115 of the schema. This conversion is step 207 of FIG. 18.

Preferably the dual Schema File 111 contains a "time stamp", which indicates the last time the server side database description was modified. The worker 19 checks this time stamp and, after the initial transmission of the database description 118, will only send a copy of the database description to the Interface Layer 17 if the server side database 23 has been reorganized.

As an example of user modification at the workstation 11, a user may desire to edit data items in the Schema File 111 to add longer names. Suppose the data items are expressed as:

T

A

B

C

Where "T" is a table name and "A", "B", and "C" are data items. At this point, the workstation Schema File 111, as initially created, includes the same contents in both the original and modifiable areas 113, 115, as shown in FIG. 17. Now, the user may open the Schema File 111, which retrieves it from disk 27 to local memory 31. Next, the user edits the schema such that the modifiable copy 115 now reads:

Table
   Apple
   Boy
   Cat

These names may be characterized as being "more meaningful" to the user. To complete the operation, the user executes a "Save" operation, which updates the "modifiable" copy of the schema in the dual Schema File on disk 27. The modified version of the schema is used the next time the user accesses the database, and the data items will be presented with their new names.

Figure 19:
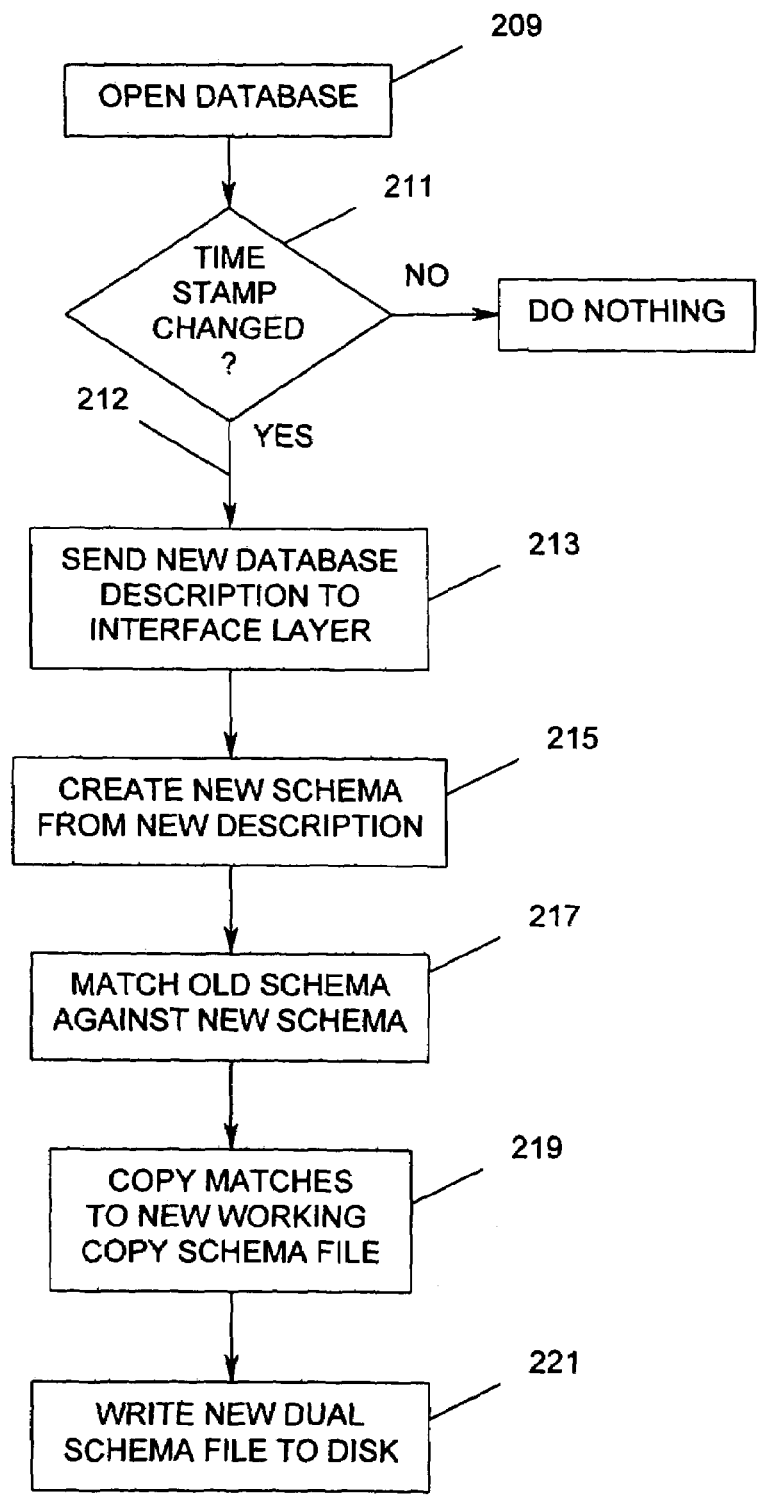
FIG. 19 is a flow chart of a second process implemented in connection with the apparatus of FIG. 16.

A second example illustrated in FIG. 19 will illustrate the method of operation according to the preferred embodiment in response to reorganization of the database 23. Assume that after the workstation user has updated the modifiable schema copy 115 in the dual Schema File 111 as described above, the database administrator at terminal 117 reorganizes the prior art (server side) database 23, eliminating the data item "C" from the structure "T" and adding data item "D" to structure "T". The next time the user attempts to access the database 23, the worker 19 opens the database 23, step 209. The worker compares the time stamp sent by the Interface Layer 17 to the time stamp in the database description 118, in test 211. Continuing the example, the worker 19 will determine that the time stamps are different, because the database administrator reorganized the database, and will take path 212, as represented by a "YES" in response to test 211 of FIG. 19. The worker 19 then sends the new database description to the Interface Layer 17, step 213.

Next, the Interface Layer 17 creates a new unmodifiable schema and a new modifiable working copy schema in memory from the new database description, step 215. Then, in step 217, the Interface Layer 17 executes a merging/matching process in an attempt to preserve as many of the modifications, as are possible, that were previously made locally by the user to the modifiable schema in the dual Schema File 111 residing on the workstation disk 27. According to this process, the Interface Layer 17 compares the unmodifiable version of the new schema with the unmodifiable version of the old schema looking for matches in structures and the data items within structures. Whenever a match is found, the modifications to the structure or data item in the working copy schema in the old dual Schema File are copied over to the new working copy schema, as illustrated by step 219 of FIG. 19. For those items where no match is found, the new working copy schema remains unchanged and is left matching the new unmodifiable schema. When the analysis is completed, the Interface Layer 17 writes the new dual Schema File to disk 27, removing the old dual Schema File, step 221.

Continuing the first example above, if the Interface Layer 17 is able to recognize that the reorganized structure T' in the new schema is the same as the structure T in the old schema (and also that A' and B' are the same as A and B) then the new working copy 115 of the new Schema File 111 would have the entries:
   Table
      Apple
      Boy
      D Thus, according to the preferred embodiment, the user modified terms are automatically preserved to the greatest extent possible. Note that an unmodifiable copy of "Table/Apple,Boy,D" is not recorded; instead an unmodifiable copy 113 of "T'/A',B',D" is stored in the Schema File 111 and also a working copy 115 of "Table/Apple,Boy,D" is stored in the Schema File 111. The matching capability just described is not restricted just to names, but includes all of the changes that are performed/allowed by the Schema Utility 25.

The following tables identify specific data type mappings supported by the Schema Utility of the preferred embodiment. In particular, the prior art database description identifies the following data types, which are given default mappings to OLE DB data types.

| Database Description DASDL construct | Schema File data type | OLE DB data type |
|---|---|---|
| ALPHA | item_alpha | DBTYPE_STR |
| REAL(Sp) | item_integer | DBTYPE_I1 I2_I4_I8 |
| REAL(p) | item_us_integer | DBTYPE_UI1_UI2_UI4_UI8 |
| NUMBER(S) | item_packed | DBTYPE_NUMERIC |
| NUMBER | item_us_packed | DBTYPE_NUMERIC |
| REAL(Sp,s) | item_fixed | DBTYPE_NUMERIC |
| REAL(p,s) | item_us_fixed | DBTYPE_NUMERIC |
| REAL | item_real | DBTYPE_R8 |
| BOOLEAN | item_Boolean | DBTYPE_BOOLEAN |
| FIELD | item_field | DBTYPE_UI1_UI2_UI4_UI8 |
| GROUP | grouped_item | DBTYPE_BYTES |
| TYPE | item_record_type | DBTYPE_UI1 |
| ALPHA with CCSVERSION= KANJI | item_db_alpha | DBTYPE_WSTR |

The prior art database description contains the following data types, which might be legitimately mapped to the following OLE DB data types, but the database description does not contain enough information to explicitly support the mapping. The Schema Utility is available to assign these mappings on an item-by-item basis. The Schema Utility only displays options for selections that are valid for the data item.

| Database Description DASDL construct | Schema File data type | OLE DB data type |
|---|---|---|
| ALPHA Non-character data | item_BYTES | DBTYPE_BYTES |
| ALPHA Even number of bytes | item_WSTR | DBTYPE_WSTR |
| ALPHA Size between 5 and 8 bytes | item_alpha_date | DBTYPE_DATE |
| NUMBER(S) Size between 5 and 8 digits | item_packed_date | DBTYPE_DATE |
| NUMBER Size between 5 and 8 digits | item_us_packed_date | DBTYPE_DATE |
| REAL(p) Size between 5 and 8 digits | item_integer_date | DBTYPE_DATE |
| REAL(Sp) Size between 5 and 8 digits | item_us_integer_date | DBTYPE_DATE |
| REAL(Sp,s) Size between 5 and 8 digits | item_fixed_date | DBTYPE_DATE |
| REAL(p,s) Size between 5 and 8 digits | item_us_fixed_date | DBTYPE_DATE |
| ALPHA with CCSVERSION=KANJI Non-character data | item_BYTES | DBTYPE_BYTES |
| ALPHA with CCVERSION=KANJI UCS2NT character data | item_WSTR | DBTYPE_WSTR |

If the data type selected maps to DBTYPE_DATE, the Schema Utility requires that the date format also be selected. Depending upon the size of the data item (5, 6, 7, or 8 characters or digits) the following formats are presented for selection.

| Size | Format |
|---|---|
| 5 | YYDDD |
| 5 | DDDYY |
| 6 | YYMMDD |
| 6 | MMDDYY |
| 6 | DDMMYY |
| 6 | YYYDDD |
| 6 | DDDDDD |
| 7 | CCYYDDD |
| 7 | DDDCCYY |
| 8 | CCYYMMDD |
| 8 | MMDDCCYY |
| 8 | DDMMCCYY |

As those skilled in the art will appreciate, the methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

From the above description, those skilled in the art will further appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. In a system wherein a data source schema describes structures and data items, with their data types, the data source schema corresponding to a database description of a data source at a server, the structures and data types having been mapped into a set of OLE DB structures and data types recognized by a client, the client being arranged to access the data source via an OLE DB data provider, the method comprising:
    maintaining a first dual Schema File at a client side terminal, the first dual Schema File comprising a first unmodifiable copy of the data source schema and a first modifiable working copy of the data source schema;
    altering the database description of the data source at the server;
    transmitting the altered database description to the client;
    receiving the altered database description at the client; and
    creating a second dual Schema File at the client to replace the first dual Schema File, the second dual Schema File comprising a second unmodifiable copy and a second modifiable copy, the operation of creating the second dual Schema File comprising:
    creating the second unmodifiable copy corresponding to the received altered database description;
    comparing the second unmodifiable copy to the first unmodifiable copy to find matches between respective components thereof; and
    creating the second modifiable working copy, the second modifiable working copy includes components of the first modifiable working copy corresponding to the matched components found from the operation of comparing.

2. The method of claim 1 wherein the database description is altered in response to administrator changes entered at the server.

3. The method of claim 1 wherein the operation of creating the second modifiable working copy comprises:
    copying the components of the first modifiable working copy corresponding to the matched components into the second modifiable working copy.

4. The method of claim 3 further including the operation of checking a time stamp prior to transmitting the altered database description to the client.

5. The method of claim 1 further including the operation of writing the second unmodifiable copy and the second modifiable working copy to disk to replace the first dual Schema File with the second dual Schema file.

6. The method of claim 1 further including the operation of checking a time stamp prior to transmitting the altered database description to the client.

7. Computer executable process steps operative to control a computer and stored on a computer readable medium, said steps being operative to:
    establish a first dual Schema File at a client, the first dual Schema File comprising a first unmodifiable copy of a data source schema and a first modifiable working copy of the data source schema; and
    create a second dual Schema File at the client to replace the first dual Schema File in response to receipt of an altered database description, the second dual Schema File comprising a second unmodifiable copy and a second modifiable copy, the step operative to create the second dual Schema File comprising:
    creating the second unmodifiable copy corresponding to the received altered database description;
    comparing the second unmodifiable copy to the first unmodifiable copy to find matches between respective components thereof; and
    creating the second modifiable working copy, the second modifiable working copy includes components of the first modifiable working copy corresponding to the matched components found from the step of comparing.

8. The process steps of claim 7 wherein the step operative to create the second modifiable working copy comprises:
    copying the components of the first modifiable working copy corresponding to the matched components into the second modifiable working copy.

9. The process steps of claim 7 further including the steps of writing the second unmodifiable copy and the second modifiable working copy to disk to replace the first dual Schema File with the second dual Schema File.

10. A method comprising the operations of:
    maintaining a first dual Schema File at a client, the first dual Schema File comprising a first unmodifiable copy of a data source schema and a first modifiable working copy of the data source schema, the data source schema corresponding to a database description of a data source at a server;

altering the database description at the server;

transmitting the altered database description to the client;

receiving the altered database description at the client; and creating a second dual Schema File at the client to replace the first dual Schema File, the second dual Schema File comprising a second unmodifiable copy and a second modifiable copy, the operation of creating the second dual Schema File comprising:

creating the second unmodifiable copy corresponding to the received altered database description;

comparing the second unmodifiable copy to the first unmodifiable copy to find matches between respective components thereof; and creating the second modifiable working copy, the second modifiable working copy includes components of the first modifiable working copy corresponding to the matched components found from the operation of comparing.

11. The method of claim 10 wherein the operation of creating the second modifiable working copy comprises:

copying the components of the first modifiable working copy corresponding to the matched components into the second modifiable working copy.

12. An apparatus in a system wherein a data source schema describes structures and data items, with their data types, the data source schema corresponding to a database description of a data source at a server, the structures and data types having been mapped into a set of OLE DB structures and data types recognized by a client, the client being arranged to access the data source via an OLE DB data provider, the apparatus comprising:

means for maintaining a first dual Schema File at a client, the first dual Schema File comprising a first unmodifiable copy of the data source schema and a first modifiable working copy of the data source schema;

means for altering the database description of the data source at the server;

means for transmitting the altered database description to the client;

means for receiving the altered database description at the client; and means for creating a second dual Schema File at the client to replace the first dual Schema File, the second dual Schema File comprising a second unmodifiable copy and a second modifiable copy, the means for creating the second dual Schema File comprising:

means for creating the second unmodifiable copy corresponding to the received altered database description;

means for comparing the second unmodifiable copy to the first unmodifiable copy to find matches between respective components thereof; and means for creating the second modifiable working copy, the second modifiable working copy includes components of the first modifiable working copy corresponding to the matched components found from the operation of comparing.

13. The apparatus of claim 12 wherein the database description is altered in response to administrator changes entered at the server.

14. The apparatus of claim 12 wherein the means for creating the second modifiable working copy comprises:

means for copying the components of the first modifiable working copy corresponding to the matched components into the second modifiable working copy.

15. The apparatus of claim 14 further including means for checking a time stamp prior to transmitting the altered database description to the client.

16. The apparatus of claim 12 further including means for writing the second unmodifiable copy and the second modifiable working copy to disk to replace the first dual Schema File with the second dual Schema File.

17. The apparatus of claim 12 further including means for checking a time stamp prior to transmitting the altered database description to the client.

* * * * *